Dec. 2, 1930.  J. H. CONE  1,783,559
ELECTRICAL MEASURING INSTRUMENT
Filed March 15, 1928

INVENTOR.
James H. Cone.
BY
Wesley G. Carr
ATTORNEY

Patented Dec. 2, 1930

1,783,559

UNITED STATES PATENT OFFICE

JAMES H. CONE, OF ROSILAND, NEW JERSEY, ASSIGNOR TO WESTINGHOUSE ELECTRIC & MANUFACTURING COMPANY, A CORPORATION OF PENNSYLVANIA

ELECTRICAL MEASURING INSTRUMENT

Application filed March 15, 1928. Serial No. 261,829.

My invention relates to electrical measuring instruments and more particularly to suppressed-zero meters of the movable core type.

In accordance with my invention, there is provided a winding having a magnetizable structure or vane coacting therewith, the aforesaid structure or vane being biased in one direction into engagement with suitable restraining means or stop structure.

Further, in accordance with my invention, an oscillatory magnetizable structure, coacting with, or actuated by, a winding, comprising a deflecting member moves toward and into engagement with a stop member under the influence of a suitable biasing spring.

Further, in accordance with my invention, the aforesaid magnetizable structure controls movement of a deflecting pointer and comprises a plurality of vanes whereby the magnetic effect between said vanes and an actuating winding is suitably changed or varied.

My invention resides in the apparatus and features of construction of the character hereinafter described and claimed.

For an illustration of one of the forms my invention may take, reference is to be had to the accompanying drawings in which.

Figure 1:
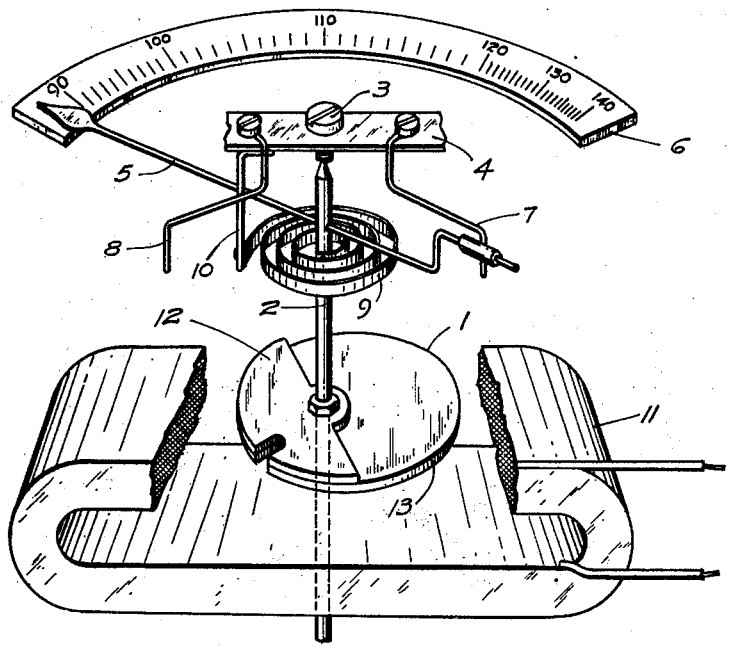
Figure 1 is a perspective view illustrating an electrical measuring instrument constructed in accordance with my invention.

Referring to Fig. 1, an electrical measuring instrument constructed in accordance with my invention comprises a magnetizable structure 1 eccentrically mounted on a shaft 2, one end of which is mounted in a bearing (not shown) and the other end of which is mounted in a bearing 3 disposed in a plate or member 4.

Carried by, and movable with, the shaft 2 is a pointer or deflecting member 5 which coacts with, or plays over, a scale 6. One end of the pointer 5 moves between stop members 7 and 8 mounted, in the example shown, on the aforesaid plate 4. The pointer 5 is biased in a counter-clockwise direction (Fig. 1) by a spiral spring 9, or equivalent, one end of which is secured to the shaft 2 and the other end of which is secured to a member 10 carried, preferably, by the member 4.

Figures 2, 3:
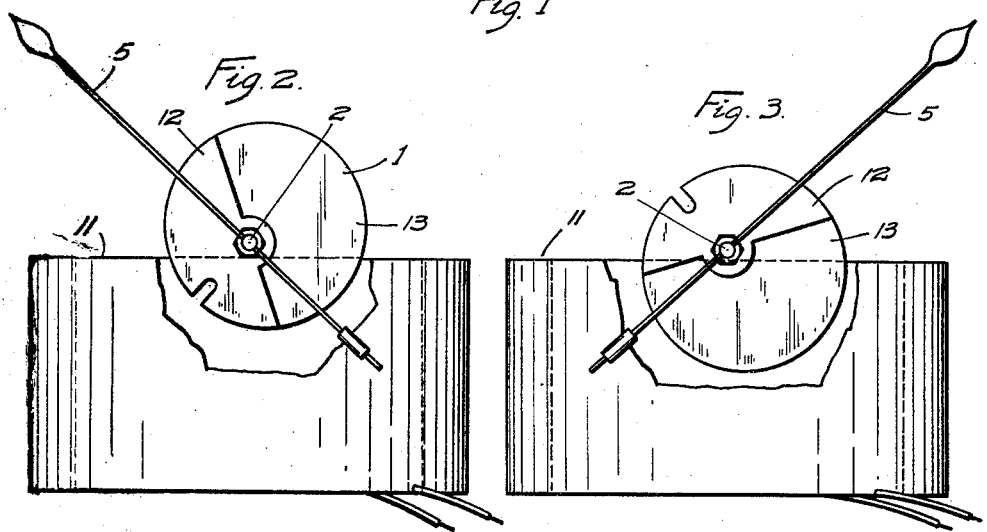
Fig. 2 is a plan view of part of the structure shown in Fig. 1.
Fig. 3 is a plan view corresponding to Fig. 2 but showing another position of the parts.

Coacting with the aforesaid magnetizable structure 1 is a coil or winding 11 so disposed with respect to said structure 1 that, upon increase in the magnitude of the current traversing said coil or winding, the structure 1 moves in a clockwise direction, (Figs. 2 and 3) within the spaced defined by the coil convolutions.

As stated above, the pointer 5 is biased in a counter-clockwise direction (Fig. 1). The torque thus applied to the pointer 5 is substantial and is of such magnitude that movement thereof in a clockwise direction (Fig. 1) does not occur until a current of predetermined magnitude traverses the winding 11. In the example illustrated, the aforesaid current is one that is produced when the winding 11 is connected across a ninety volt line. However, it will be understood that initial movement of the pointer 5 may be effected by current of such other magnitude as may be suitable or desirable.

When the spring 9 functions as described above, it results that equal increases in the magnitude of the current traversing the winding 11 do not produce corresponding equal deflections of the pointer 5 when the magnetizable structure cooperating with said winding corresponds to the magnetizable structure of the prior art, the latter usually being a single plane disk-like member. In other words, with the prior-art arrangement, the pointer 5 tends to drift or creep. Apparently, this result follows because the ratio between the increase in attractive effect of the winding 11 and the increase in the opposing effect of the spring 9 remains substantially equal for increases in the magnitude of the current traversing said winding 11.

Figure 4:
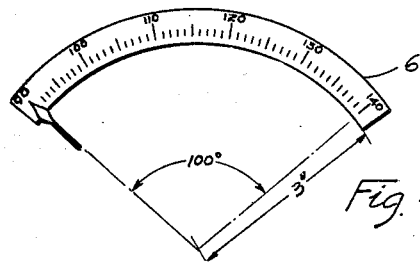
Fig. 4 is a plan view of the scale shown in Fig. 1.

In accordance with my invention and to the end that equal increases in the magnitude of the current traversing said winding 11 may produce substantially equal deflections of said pointer 5, there is utilized, in the example shown, a magnetizable structure 1 which comprises a plurality of disks 12 and 13. With a construction of this character, the utilization of the supplementary disk 12 causes a decrease in the attractive effect of the winding 11 on the magnetizable structure thereby leaving the latter more effectively under the control of the spring 9. As a result, through an angle of some 100 degrees, more or less, the pointer 5 moves over a scale of the character indicated in Fig. 4 wherein the scale sub-divisions are substantially equal, although it may be necessary to have the sub-divisions between the indicia 90 and 100 slightly smaller than the other sub-divisions.

Mechanism of the character herein illustrated and described is particularly adapted for use as a voltmeter, the described construction being advantageous because wide or large angular deflection of the pointer 5 is obtained throughout the range of voltages usually encountered on 110 volt lines.

I claim as my invention:

1. In a meter, the combination with a hollow coil, a pivoted shaft, and a disc of magnetizable material eccentrically mounted on said shaft to be influenced by the flux field of said coil, of an auxiliary magnetizable segment of a disc mounted on said shaft adjacent said first named disc, a stop, and means for biasing said shaft against said stop, whereby said disc is not moved by the flux field of said coil until the same has been energized by a predetermined current, said disc thereafter moving said shaft in substantially uniform increments upon corresponding increments of current energizing said coil.

2. In a meter, the combination with a winding, a shaft, and a disc of magnetizable material eccentrically mounted on said shaft to be influenced by the flux field of said winding, of an auxiliary magnetizable segment mounted for movement with said disc, and means for initially biasing said shaft whereby said disc is not moved by the flux field of said winding until the same has been energized to a predetermined degree, said disc thereafter moving said shaft in substantially uniform increments in accordance with the degree of energization of said winding.

3. In a meter of the suppressed-zero type, a winding adapted to be energized in accordance with a quantity to be measured, a shaft mounted for pivotal movement disposed adjacent to said winding and normal to the axis thereof, a disc armature secured to said shaft and disposed to be influenced in accordance with the energization of said winding for rotation in one direction, biasing means tending to cause the rotation of said armature in the opposite direction, and means for limiting the movement of said shaft in both directions, said armature embodying means for definitely overcoming said biasing means to move said armature away from one limiting position thereof in response to a predetermined energization of said winding.

4. In a meter of the suppressed-zero type, a winding adapted to be energized in accordance with a quantity to be measured, a shaft mounted for pivotal movement disposed adjacent to said winding and normal to the axis thereof, a disc armature secured to said shaft and disposed to be influenced in accordance with the energization of said winding for rotation in one direction, biasing means tending to cause the rotation of said armature in the opposite direction, and means for limiting the movement of said armature, under the influence of said biasing means, comprising an auxiliary magnetizable segment mounted adjacent said armature.

In testimony whereof, I have hereunto subscribed my name this ninth day of March, 1928.

JAMES H. CONE.